(12) United States Patent  
Lüthy et al.

(10) Patent No.: US 8,859,925 B2
(45) Date of Patent: Oct. 14, 2014

(54) ELECTRIC SWITCHGEAR

(75) Inventors: Norbert Lüthy, Berlin (DE); Tomasz Magier, Berlin (DE); Manfred Meinherz, Berlin (DE); Clemens Rüthnick, Kleinmachnow (DE)

(73) Assignee: Siemens Aktiengesellschaft, Munich (DE)

( * ) Notice: Subject to any disclaimer, the term of this patent is extended or adjusted under 35 U.S.C. 154(b) by 186 days.

(21) Appl. No.: 13/577,975

(22) PCT Filed: Feb. 7, 2011

(86) PCT No.: PCT/EP2011/051712
§ 371 (c)(1),
(2), (4) Date: Aug. 24, 2012

(87) PCT Pub. No.: WO2011/098416
PCT Pub. Date: Aug. 18, 2011

(65) Prior Publication Data
US 2012/0312668 A1  Dec. 13, 2012

(30) Foreign Application Priority Data
Feb. 9, 2010  (DE) .......................... 10 2010 007 691

(51) Int. Cl.
*H01H 33/08* (2006.01)
*H02B 13/035* (2006.01)
*H01H 9/52* (2006.01)

(52) U.S. Cl.
CPC ................ *H02B 13/035* (2013.01); *H01H 9/52* (2013.01)
USPC ............................................. 218/53; 218/66

(58) Field of Classification Search
USPC ................................................. 218/53–57, 66
See application file for complete search history.

(56) References Cited

U.S. PATENT DOCUMENTS

| 4,489,226 A | * | 12/1984 | Holmgren et al. | ............... 218/57 |
| 4,517,425 A | * | 5/1985 | Martin | ............................ 218/66 |
| 4,829,150 A | | 5/1989 | Sasamori | |
| 5,025,118 A | | 6/1991 | Meinherz et al. | |
| 5,721,412 A | | 2/1998 | Schifko et al. | |
| 7,432,465 B2 | | 10/2008 | Pavlovic et al. | |
| 8,598,483 B2 | * | 12/2013 | Dienemann et al. | ............ 218/53 |
| 2006/0283842 A1 | | 12/2006 | Pavlovic et al. | |

FOREIGN PATENT DOCUMENTS

| CH | 556 610 A | 11/1974 |
| CH | 556610 A | 11/1974 |
| DE | 2 051 151 A1 | 4/1972 |
| DE | 2051151 A1 | 4/1972 |
| DE | 89 12 889 U1 | 1/1990 |
| DE | 38 81 248 T2 | 9/1993 |

(Continued)

*Primary Examiner* — Truc Nguyen
(74) *Attorney, Agent, or Firm* — Laurence A. Greenberg; Werner H. Stemer; Ralph E. Locher

(57) ABSTRACT

An electric switchgear includes an interrupter unit having a first connecting line and a second connecting line. The interrupter unit is disposed inside a fluid-tight encapsulating housing that is filled with an electrically insulating fluid. The interrupter unit is further surrounded by a shielding housing in at least some sections. The first connecting line has a flow channel for the fluid. A first outlet opening of the flow channel leads to the shielding housing and a second outlet opening leads to the exterior of the shielding housing.

9 Claims, 6 Drawing Sheets

(56) References Cited

FOREIGN PATENT DOCUMENTS

| EP | 0 744 803 | A2 | 11/1996 |
| EP | 1 569 254 | A1 | 8/2005 |
| JP | 50063130 | U | 6/1975 |
| JP | 50064774 | A | 6/1975 |
| JP | 53011059 | U | 1/1978 |
| JP | 53086575 | U | 7/1978 |

* cited by examiner 24a 24b 24c

ELECTRIC SWITCHGEAR

BACKGROUND OF THE INVENTION

Field of the Invention

The invention relates to an electrical switching device having an interrupter unit, which has a first connecting line and a second connecting line, and having a fluid-tight encapsulating housing, which surrounds the interrupter unit and is filled with an electrically insulating fluid, and having a shielding housing which at least partially surrounds the interrupter unit.

An electrical switching device such as this is known, for example, from European patent application EP 0 744 803 A2, which describes an electrical switching device as a disconnector for a metal-encapsulated, gas-insulated switchgear assembly. The disconnector there has an interrupter unit with a first and a second connecting line. The interrupter unit is arranged within a fluid-tight encapsulating housing. The interior of the encapsulating housing is filled with an electrically insulating fluid. Furthermore, the interrupter unit is surrounded by a shielding housing, which provides the interrupter unit with a dielectrically advantageous form.

The encapsulating housing prevents the electrically insulating fluid from emerging. It is thus possible to limit the volume of electrically insulating fluid required, and to use comparatively high-cost fluids for electrical insulation.

Electric currents generally flow through the interrupter unit with its two connecting lines and cause corresponding resistive heating effects. The electrically insulating fluid, which is closed off, is able only to a limited extent to absorb this heat and to pass it on.

On the one hand, it is desirable to reduce the spatial extents of such encapsulating housings and to reduce the requirement for electrically insulating fluid. However, this means that the heat which may be introduced into the electrically insulating fluid is likewise reduced. Emission of heat to the encapsulating housing via the electrically insulating fluid is also possible only to a limited extent. In order to prevent unacceptable overheating of the interrupter unit, the current load on the interrupter unit must be limited.

BRIEF SUMMARY OF THE INVENTION

The object of the invention is therefore to specify an electrical switching device which can be subjected to a higher current load while having compact dimensions.

According to the invention, the object is achieved, for an electrical switching device of the type mentioned initially, in that the first connecting line has at least one flow channel for the fluid, which flow channel opens with a first mouth opening within the shielding housing and opens with a second mouth opening outside the shielding housing.

If the first connecting line is equipped with a flow channel, then it is possible for fluid to pass out of the interior of the shielding housing and for this fluid to emerge into the encapsulating housing outside the shielding housing. It is therefore possible to carry fluid which is located in the inner area of the interrupter unit away in an improved manner, and thus to also dissipate heat from these central areas of the interrupter unit. Current paths which connect the two connecting lines to one another are located in the interior of the interrupter unit, as a result of which a current flow can also be observed in the interior of the interrupter unit. Because of the shielding housing, the electrical fluid cannot flow freely around this area, as a result of which increased heating occurs there. The flow channel can now specifically assist a flow in the interior of the shielding housing.

In this case, the shielding housing can be designed such that it at least partially also carries out the function of a connecting line. However, it is also possible to apply only an electrical potential of at least one or both connecting line or lines to the shielding housing in order to produce an electrical shielding effect. Current can flow independently of the shielding housing from the first to the second connecting line, or conversely from the second to the first connecting line, of the interrupter unit. A switching path is formed between the first and the second connecting line of the interrupter unit, that is to say the interrupter unit can provide potential isolation between the first and the second connecting line. It is therefore possible to interrupt a current path running through the interrupter unit, or to make this current path again.

In this case, the purpose of the shielding housing is to provide the interrupter unit with a dielectrically advantageous envelope contour at least in places.

The fluid-tight encapsulating housing is designed to be electrically conductive, and is connected to ground potential. In contrast to this, the connecting lines and the shielding housing can have a considerably higher electrical potential applied to them, for example of several thousand or several hundred thousand volts. The potential difference results in electrical fields being formed between inner wall surfaces of the encapsulating housing, which prevent electrically insulating fluid from emerging from the encapsulating housing, and the assemblies which are located within the encapsulating housing and are at a higher electrical potential than the encapsulating housing, and these electrical fields dielectrically load the electrically insulating fluid. As the operating voltage increases, discharges can occur within the electrically insulating fluid.

The electrically insulating fluid is dependent on the environmental conditions, that is to say in particular the density of the electrically insulating fluid, which is governed essentially by the pressure of the fluid in the interior of the encapsulating housing and the ambient temperature. Furthermore, a high dielectric strength can be achieved for the electrically insulating fluid over short distances, by the choice of a suitable electrical fluid. In particular, gases such as sulfur hexafluoride, nitrogen or mixtures of sulfur hexafluoride and nitrogen have been found to be effective in this case. A pressure of several bar can be applied to the electrically insulating fluid in the interior of the encapsulating housing, as a result of which the pressure in the interior of the encapsulating housing is higher than the pressure of a fluid medium which surrounds the encapsulating housing itself. This results in a pressure difference between the interior of the encapsulating housing and the exterior of the encapsulating housing, as a result of which the electrically insulating fluid can emerge into the surrounding area if there is a leak from the encapsulating housing. Initially, this prevents contamination of the interior of the encapsulating housing by fluid flowing back from the area surrounding the encapsulating housing. A leak from the encapsulating housing can be identified in good time by appropriate monitoring of the electrically insulating fluid.

By way of example, the flow channel is arranged within one of the connecting lines, as a result of which there is no need to provide additional physical space for the arrangement of separate flow channels. For example, the first connecting line may therefore be in the form of a tube, which is arranged with respect to the shielding housing such that a first mouth opening of the flow channel opens within the shielding housing, and the other end of the flow channel, with the second mouth opening outside the shielding housing, opens, however, within the encapsulating housing. The connecting line may, for example, have an annular cross section, and may be prismatic. By way of example, it is possible in this case for the first connecting line to be permanently electrically conductively connected to the shielding housing. However, it is also possible for the shielding housing to be arranged such that it is electrically isolated from the first encapsulating housing. In this case, it is particularly advantageous for the flow channel to project sufficiently far into the shielding housing that the mouth opening of the flow channel projects beyond an inner wall of the shielding housing, and fluid can flow in from a central area which is located at a distance from the inner wall of the shielding housing. For this purpose, the inner wall of the shielding housing should be different to the wall in which the first mouth opening is located.

In this case, it is advantageous for the connecting line to pass through the housing wall of the shielding housing, that is to say, on the one hand, fluid can be sucked in the flow channel on the one hand in the interior of the shielding housing as far as possible away from a housing wall of the shielding housing, and fluid can likewise emerge from the flow channel at a distance from the shielding housing. It is therefore possible for electrically insulating fluid to circulate from the interior of the shielding housing into a remote area of the encapsulating housing, independently of the shape of the shielding housing.

The flow channel provides a capability for fluid to pass through a wall of the flow housing without the fluid having to come into contact with the housing wall of the shielding housing as it passes through.

In this case, it is advantageous for a main axis of the flow channel to be located vertically, such that the fluid which has been heated in the interior of the interrupter unit flows through the flow channel, driven by convection. The flow channel in this case acts like a form of chimney and additionally assists a fluid flow.

A further advantageous refinement allows the first connecting line to end at a coupling piece which has at least one radially aligned recess.

The first connecting line can be terminated via the coupling piece. Various designs may be used as the coupling piece. The coupling piece allows the first connecting line, and therefore the interrupter unit, to be electrically conductively coupled to a current path to be disconnected/to be switched. The coupling piece is, for example, tubular, with the coupling piece surrounding the second mouth opening, with electrically insulating fluid which emerges from the second mouth opening of the connecting line bypassing in the radial direction, via the radially aligned recess. The recess or the recesses may have widely differing cross sections which, for example, may be chosen to be circular, oval or in the form of slots, etc., as required. It is therefore possible for the first connecting line to be in the form of a tube, for example, and to be provided centrally with a flow channel. The first connecting line can, for example, be coupled to a busbar via the coupling piece, in which case the busbar may have any desired form, irrespective of the form of the first connecting line. It is therefore possible to integrate an electrical switching device according to the invention in existing installations as well, and to advantageously influence their current load capability by improving the flow of fluid through them.

By way of example, the coupling piece may be in the form of a socket, thus allowing the first connecting line to be inserted into a socket opening in the coupling piece in the form of a plug-in contact, allowing electrical contact to be made with the first connecting line via this plug connection. The coupling piece may, for example, have a supporting body to provide mechanical robustness, into which contact elements are inserted in order to make electrically conductive contact with the first connecting line. By way of example, spring elements may be inserted as contact elements into the supporting body, which can be pressed, elastically deformably, onto the first connecting line. By way of example, spring-loaded or self-sprung contact fingers may be used as spring elements.

By way of example, the coupling piece may be designed such that the supporting body is tubular, with socket openings being arranged on each of the end faces of the tubular supporting body of the coupling piece, into which the first connecting line and a further connecting element, for example a busbar, can be inserted, with bridging and electrical contact being produced from the first connecting line to the further connecting element via the coupling piece. The radially aligned recess in the coupling piece may, for example, be covered by the contact elements and may be at least partially concealed by them, such that a flow of electrically insulating fluid, which emerges from the mouth opening of the first connecting line, flows around the contact element or elements before passing through the radially aligned recess in the coupling piece. The fluid therefore likewise passes through the coupling piece, and therefore cools it.

Furthermore, it may be advantageous for the coupling piece to have a plurality of radially aligned recesses which are arranged in an annular shape circumferentially, separated axially.

An annular arrangement of a plurality of recesses makes it possible to divert the fluid flow emerging from the first mouth opening and to allow it to flow out in a large number of radial directions. It is thus possible to introduce a multiplicity of recesses, which intrinsically have small cross sections, into the coupling piece, although the total area of the recesses forms a sufficiently large cross section to allow the fluid flow to emerge from the coupling piece. Particularly if the recesses are at least partially covered/covered over, a sufficiently large cross section can be made available by a multiplicity of recesses. In this case, it is advantageous for a plurality of recesses, arranged on a plurality of respective annular paths, to be distributed over the circumference of the coupling piece, thus making it possible to provide adequate wall thicknesses on the coupling piece in order to ensure an adequate mechanical supporting capability for the overall arrangement. The recesses can preferably be arranged distributed uniformly on their respective annular paths, with the positions of the recesses being offset with respect to one another in the circumferential direction on annular paths which are immediately adjacent to one another. This prevents excessive weakening of the mechanical strength of the coupling piece. In this case, it is advantageously possible for the recesses each to be in the form of an elongated hole.

A further advantageous refinement allows the first connecting line to pass through the shielding housing, wherein a channel for the fluid is arranged in the passage area between the first connecting line and the shielding housing.

Passing the first connecting line through the shielding housing makes it possible to form a channel for the fluid in the area in which the connecting line passes through. This channel may in this case advantageously be bounded on the one hand by the connecting line and on the other hand by the shielding housing itself. The channel should advantageously be an intrinsically closed channel around the first connecting line, preferably a channel in an annular shape around the first connecting line. The outer envelope surface of the first connecting line can be used to bound the channel. The housing wall of the shielding housing can form a further body edge bounding the channel. An annular channel can preferably be arranged between the connecting line and the shielding housing in the area in which the first connecting line passes through, in such a way that there is no electrically conductive connection whatsoever at this point between the shielding housing and the first connecting line. It is therefore possible on the one hand for the first connecting line to have a flow channel in its interior, and on the other hand to be surrounded by an additional channel on its outer circumference in the area where the first connecting line passes through the shielding housing. The electrically insulating fluid can flow through the first connecting line both on the outer envelope side and on the inner envelope side. This results in particularly effective cooling since electrically insulating fluid which is located in the immediate vicinity of the passage area in the shielding housing can flow out into the shielding housing in the area of the passage point in the first connecting piece. In addition, the first connecting line can pass fluid out of a central area which is remote from the passage area through the shielding housing. This allows a better flow through the shielding housing, allowing heated fluid to be carried out of a large number of areas of the shielding housing. This avoids sections within the shielding housing in which fluid located there makes only a minor contribution to heat exchange. Sections such as these are disadvantageous because heated electrically insulating fluid can accumulate there as well. It is also advantageous for fluid which is flowing out of the channel in the passage area to be passed on the envelope side in the direction of the profile of the first connecting line. Fluid emerging from the channel in the passage area can advantageously be merged with fluid which is emerging radially from the recesses in the coupling piece. Merging the two fluid flows into one another results in thorough swirling and mixing.

When the two fluid flows are merged into one another, the electrically insulating fluid surrounding the interrupter unit is additionally mixed in, thus assisting cooling of the electrically insulating fluid passing out of the interrupter unit.

A further advantageous refinement allows a contact piece of the switching device to be movable along a movement axis through a housing wall of the shielding housing, wherein the flow channel opens in the shielding housing from the radial direction with respect to the movement axis.

An electrical switching point can be formed between the first connecting line and the second connecting line of the interrupter unit, and is used to make or to interrupt a current path. For this purpose, it is possible to arrange a movable contact piece between the first and the second connecting line, which can make or disconnect a current path between the two connecting lines. For example, the contact piece can be designed such that it can be moved along a movement axis, and the switching point can be filled with the electrically insulating fluid when the current path is disconnected. Arranging the movement axis transversely with respect to the main profile of the flow channel allows heated fluid in the area of the movement axis, that is to say in the area of the contact piece which can be moved there, to be carried away easily via the flow channel. For example, disconnection arcs or initial flashovers can occur on the switching contact piece when the current path is disconnected or made, and are associated with thermal loading of the electrically insulating fluid and of the contact piece. If the first mouth opening is arranged on the envelope side, the contact piece can be moved in front of the first mouth opening of the first connecting line in such a way that, despite a comparatively small mouth opening, a large area of the movable contact piece can be moved along in front of the mouth opening. This allows improved cooling of the contact piece which can be driven, in particular during a disconnection process. If the movement axis is now passed through the housing wall of the shielding housing, it is possible for the contact piece which is guided on this movement path to also pass through the housing wall. For example, it is possible for the contact piece to be supported completely within the shielding housing when in the disconnected state. The contact piece is therefore dielectrically shielded. By way of example, the contact piece may be supported, guided and have electrical contact made with it via a sliding contact arrangement which is located within the shielding housing of the interrupter unit. The contact piece which can be moved along the movement axis is also referred to as a drivable contact piece.

As an opposing contact piece, the interrupter unit has a fixed-position opposing contact piece into which the contact piece can be moved. For this purpose, by way of example, the opposing contact piece can be in the form of a socket, into which the drivable contact piece slides. In order to shield the opposing contact piece, it may be surrounded by a shielding unit which has a toroidal external contour, with a ring of recesses being formed on a cap, which is located on the side remote from the drivable contact piece, through which recesses electrically insulating fluid can also flow to the opposing contact piece on the cap side. A fluid can flow through the opposing contact piece via the recesses, in which case it is on the one hand possible for fluid to enter via the recesses and for fluid to emerge via the opening, which is in the form of a socket, in the opposing contact piece, and vice versa. Furthermore, entry and emergence are preferably also possible through the recesses in the cap area of the opposing contact piece. The opposing contact piece may be used as a second connecting line.

A further advantageous refinement allows the electrical switching device to be a right-angle disconnector.

A disconnector is an electrical switching device which is used to open or close a current path. In this case, disconnectors must always be switched when no current is flowing since, because they have no arc quenching devices, disconnectors cannot cope with any switching arcs whatsoever, except for discharge phenomena. In the case of a right-angle disconnector, the two connecting lines are aligned with respect to one another such that main axes of the connecting lines are at an angle to one another, preferably at right angles to one another. This makes it possible to impress movements on the movable contact piece in a simple manner, for example by inputting by means of electrically insulating drive rods. On the other hand, right-angle disconnectors such as these can be positioned in a compact way in various corner areas, in order to produce an isolation gap.

In this case, it is advantageously possible for the shielding housing to have a rotationally symmetrical envelope contour, wherein the first connecting line is arranged on a first end face.

A shielding housing having a rotationally symmetrical envelope contour has the advantage that the rotation axis of the shielding housing can be aligned coaxially with respect to a main axis of one of the two connecting lines, with the main axis of the other connecting line being arranged transversely with respect to this. It may be advantageous for the first connecting line to be located on a first end face of the shielding housing, as a result of which the flow channel enters the shielding housing essentially in the area of this end face, and preferably opens in the area of the first end face.

A further advantageous refinement makes it possible to provide that the shielding housing has a second end face, and a section which widens radially with respect to the end faces is located between the first and the second end face, and the radially widened section has an opening through which the movement axis passes.

Radial widening of the shielding housing between the two end faces makes it possible to hold a movable contact piece within the shielding housing and to position this such that it is completely dielectrically shielded in the interior of the shielding housing, for example in its disconnected position. An opening in the envelope area of the radially widened section makes it possible for the movable contact piece to emerge from the shielding housing, to be moved in the direction of the fixed-position opposing contact piece, and to make electrical contact with it.

It is advantageously possible to provide that a conical transition section is arranged from the second end face to the radially widened section, in which at least one recess is arranged, which passes through the housing wall of the shielding housing.

An arrangement of recesses in the conical transition section makes it possible to allow electrically insulating fluid to enter and emerge from the shielding housing. If the first connecting line is arranged on the first end face, it is therefore possible for electrically insulating fluid to be passed out of the interior of the shielding housing via the first connecting line, and for electrically insulating fluid to enter the shielding housing, and flow on further, via the recesses in the conical transition section. This makes it possible to produce a fluid flow in a first direction in the interior of the shielding housing, that is to say parallel to one of the main axes, in particular preferably to the main axis of the first connecting line, while in contrast fluid which emerges from the channel in the passage area of the first connecting line as well as electrically insulating fluid which emerges from the second mouth opening of the first connecting line flows back in the opposite direction on the outside of the outer envelope surface of the shielding housing, in such a way that a fluid flow of the electrically insulating fluid flows around the shielding housing on the inside in a first direction, and a fluid flow in the opposite, second direction flows around outer surfaces of the shielding housing. Therefore, the shielding housing is cooled on the inside and on the outside, and a through-flow and ventilation are promoted in the interior of the electrical switching device.

One exemplary embodiment of the invention will be described in more detail in the following text, and is illustrated schematically in a drawing, in which:

DESCRIPTION OF THE INVENTION

First of all, the design of an electrical switching device will be described with reference, by way of example, to FIG. 1.

Figure 1:
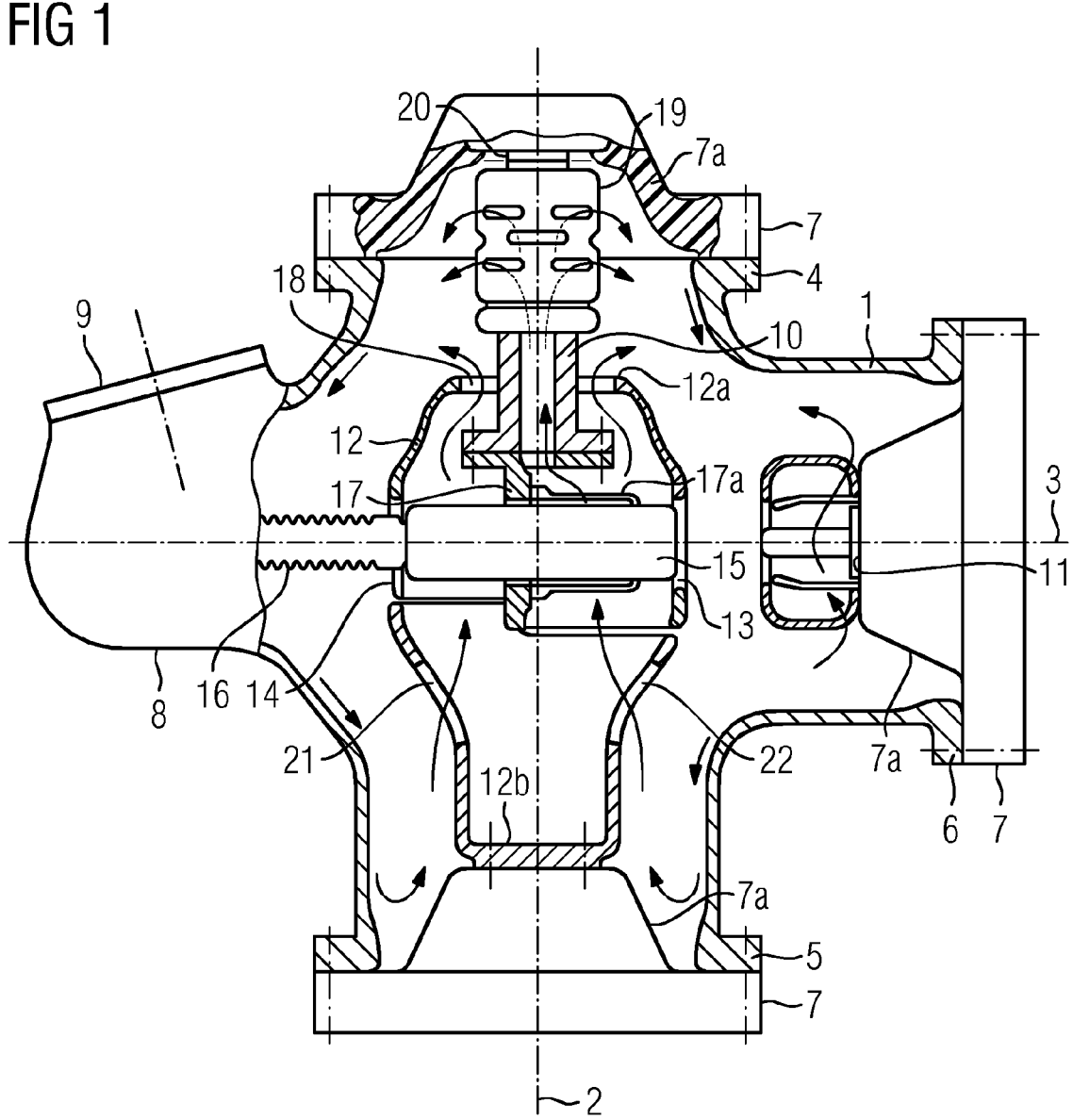
FIG. 1 shows a section through an electrical switching device having a drivable contact piece in its disconnected position.

The electrical switching device shown in FIG. 1 has a fluid-tight encapsulating housing 1. The fluid-tight encapsulating housing 1 in the present case is in the form of a metallic cast housing, with the encapsulating housing 1 having a first main axis 2 and a second main axis 3. The two main axes 2, 3 are at right angles to one another, and intersect one another. A first flange 4 and a second flange 5 of the encapsulating housing 1 are arranged at opposite ends of the first main axis 2. A third flange 6 of the encapsulating housing 1 is arranged at a first end of the second main axis 3. The three flanges 4, 5, 6 have an annular flange leaf and are each aligned coaxially with respect to the first and second main axes 2, 3, respectively. Recesses are incorporated in the flange leaves, via which the flanges 4, 5, 6 can be screwed to further assemblies, that is to say they can be flange-connected. In the present case, the intention is for disk-type insulators 7 to be flange-connected to the flanges 4, 5, 6. The disk-type insulators 7 each have an electrically insulating body 7a in the form of a funnel. The insulating body 7a in the form of a funnel is provided on its outer circumference with a frame which provides mechanical robustness and through which attachment elements project, which are mounted in the recesses in the flange leaves of the flanges 4, 5, 6. The disk-type insulators 7 close the flanges 4, 5, 6 in a fluid-tight manner, thus preventing fluid from passing through the flanges 4, 5, 6.

The encapsulating housing 1 is provided with a transmission housing 8 on the side of the second main axis 3 averted from the third flange 6. The transmission housing 8 is integrally connected to the encapsulating housing 1 and has a mounting opening which is closed in a fluid-tight manner by a mounting opening cover 9. The mounting opening allows access to the interior of the encapsulating housing 1.

The interior of the encapsulating housing 1 is provided with an interrupter unit which has a first connecting line 10 and a second connecting line 11. The first connecting line 10 is tubular and is aligned coaxially with respect to the first main axis 2. The second connecting line 11 is connected to a fixed-position opposing contact piece, and is supported on the funnel-shaped insulating body 7a of the disk-type insulator 7 of the third flange 6. The second connecting line 11 is aligned coaxially with respect to the second main axis 3. The second connecting line 11 is in the form of a bolt.

The interrupter unit has a shielding housing 12. The shielding housing 12 is equipped with a first end face 12a and a second end face 12b. The shielding housing 12 is provided with an essentially rotationally symmetrical envelope contour, and is aligned coaxially with respect to the first main axis 2. The second end face 12b of the shielding housing 12 is connected to the funnel-shaped insulating body 7a of the disk-type insulator 7 of the second flange 5, and is supported on it at a rigid angle. The shielding housing 12 is mechanically held on the encapsulating housing 1 via the funnel-shaped insulating body 7a of the disk-type insulator 7 of the second flange 5, and is positioned such that it is electrically isolated from it. Between the first end face 12a and the second end face 12b, the shielding housing has a radially widened section. The radially widened section surrounds the intersection point of the two main axes 2, 3. A first recess 13 and a second recess 14 pass through the radially widened section in the area of the second main axis 3. The recesses 13, 14 are formed essentially axially one behind the other, with the second main axis 3 running through the two recesses 13, 14. The second main axis 3 defines a movement axis for a drivable contact piece 15. A first end of the drivable contact piece 15 faces the second connecting line 11. An electrically insulating drive rod 16 is coupled to its second end, which is remote from the first end. The drive rod 16 projects into the transmission housing 8. A direction-changing transmission is arranged in the transmission housing 8 and couples a movement into the interior of the encapsulating housing 1 in a fluid-tight manner, such that the drive rod 16 can cause the drivable contact piece 15 to move along the second main axis 3.

The drivable contact piece of a sliding contact arrangement 17 is mounted in the interior of the shielding housing 12. The sliding contact arrangement 17 is supported on the shielding housing 12, within it. The sliding contact arrangement 17 has a multiplicity of contact fingers which are distributed radially around the second main axis 3 and rest on an envelope surface of the drivable contact piece 15.

The movable contact fingers of the sliding contact arrangement 17 are electrically conductively connected to the first connecting line 10. The electrical sliding contact arrangement 17 is in this case connected to the first connecting line 10 such that a first mouth opening is arranged radially with respect to the movement axis, such that the flow channel runs transversely with respect to the movement axis of the movable contact piece 15. The drivable contact piece 15 is moved in front of the first mouth opening.

The sliding contact arrangement 17 makes electrically conductive contact with the shielding housing 12. The electrical potential on the first connecting line 10 is therefore transferred to the shielding housing 12, starting from the first connecting line 10, via the sliding contact arrangement 17. The electrically conductive connections from the first connecting line 10 to the sliding contact arrangement 17 and from the shielding housing 12 to the sliding contact arrangement 17 in this case exist independently of the switching state of the electrical switching device and the position of the drivable contact piece 15.

In the present case, the electrically conductive connections between the first connecting line 10 and the shielding housing 12 via the sliding contact arrangement 17 are in the form of a current path, thus resulting in a permanent current path between the funnel-shaped insulating bodies 7a between the first flange 4 and the second flange 5. This current path may also extend via further components through the funnel-shaped insulating bodies 7a.

A tap from the current path which permanently runs between the first flange 4 and the second flange 5 can be switched via the switchable contact piece 15.

The first connecting line 10 passes through the shielding housing 12, with the shielding housing 12 bounding a channel 18 in the passage area through the first connecting piece 10, which channel 18 surrounds the first connecting line 10 in an annular shape. The first connecting line 10 is supported on the sliding contact arrangement within the shielding housing 12. The first connecting line 10 is surrounded by a coupling piece 19, outside the shielding housing 12. The second mouth opening of the first connecting line 10 ends within the coupling piece 19. The coupling piece 19 represents an electrically conductive connection between the first connecting line 10 and a further connecting element 20, which is incorporated in the funnel-shaped insulating body 7a of the disk-type insulator 7 of the first flange 4.

A current path can be made and a current path can be interrupted between the first connecting line 10 and the second connecting line 11 by means of the drivable contact piece 15. FIG. 1 shows the "open" position of the electrical switching device, that is to say there is an electrically isolating section between the first connecting line 10 and the second connecting line 11. This electrically isolating section is also referred to as a switching gap or switching point. Since the interior of the encapsulating housing 1 is filled with an electrically insulating fluid, the switching gap is also filled in an electrically isolating form, as a result of which an electrical current path between the first connecting line 10 and the second connecting line 11 is interrupted.

The shielding housing 12 has a conical transition area, at which a continuous transition is provided, starting from the second end face 12b, into the radially widened area of the shielding housing 12. In the area of the conical transition, recesses 21, 22 are incorporated in the wall of the shielding housing 12. The electrically insulating fluid can flow via the recesses 21, 22 into the interior of the shielding housing 12 of the interrupter unit of the electrical switching device. Electrically insulating fluid can flow out of the interior of the shielding housing 12, for example via the channel 18 in the area of the passage of the first connecting line 10, into the shielding housing 12. Furthermore, an outlet is provided for electrically insulating fluid via the flow channel which is located within the first connecting line 10. The flow channel in the first connecting line 10 opens with the first mouth opening within the shielding housing 12. A second mouth opening is provided at the other end of the connecting line 10, and is surrounded by the coupling piece 19. The flow channel makes it possible for electrically insulating fluid to enter the interior of the shielding housing 12, via its first mouth opening, and for electrically insulating fluid to emerge via the second mouth opening within the coupling piece 19. The two mouth openings are aligned coaxially with respect to the first main axis 2, and are each arranged on an end face in the first connecting line 10.

The coupling piece 19 has a plurality of radial recesses which are incorporated on the envelope side, distributed on a plurality of annular paths. The fluid flow in the flow channel of the first connecting line 10 is therefore diverted radially after it emerges from the second mouth opening, and is passed into the area of the encapsulating housing 1 which surrounds the shielding housing 12. Fluid emerging from the channel 18 is mixed in this area with the fluid emerging from the recesses in the coupling piece 19. Because of the increased volume and thorough mixing, the fluid which is passed out of the interrupter unit can be cooled down and its pressure can be relieved. After emerging to the exterior of the shielding housing 12, the fluid is moved back along the first main axis 2 and falls in the direction of the second flange 5, and can once again enter the interior of the shielding housing 12 via the recesses 21, 22. This circuit is driven primarily by temperature differences. The suction which is produced in this way allows electrically insulating fluid which has cooled down to flow back out of the encapsulating housing 1 via the recesses 21, 22 into the interior of the shielding housing 12.

FIG. 1 shows the electrical switching device in its disconnected position.

Figure 2:
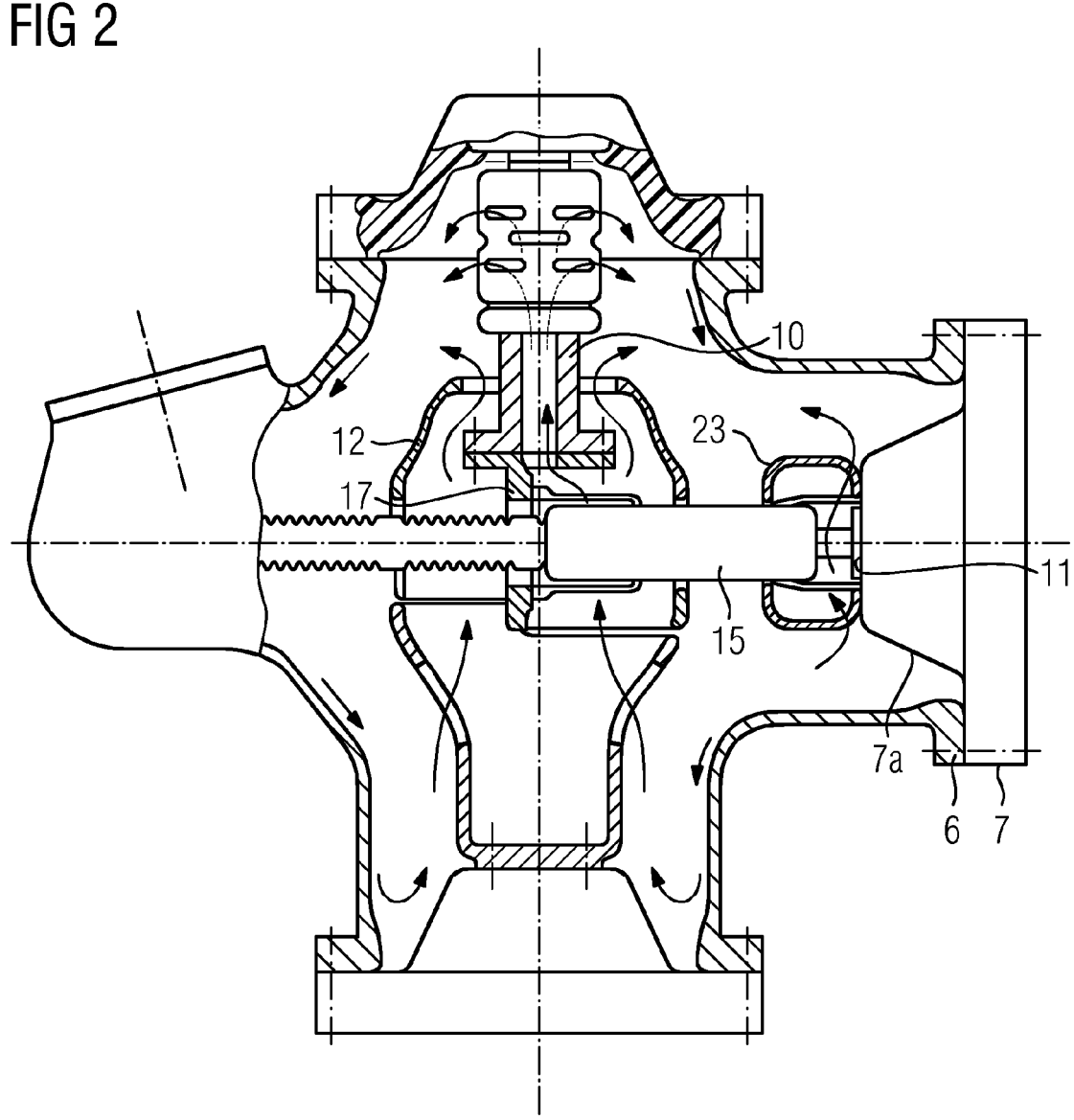
FIG. 2 shows a section through the electrical switching device having the drivable contact piece in its connected position.

FIG. 2 now shows the movable, drivable contact piece 15 in its connected position, that is to say an electrical current path is formed between the first connecting line 10 and the second connecting line 11 at the electrical switching device, and an electric current can flow from the first connecting line 10 via the sliding contact arrangement 17 and the drivable contact piece 15 to the second connecting line 11. Current can therefore flow between the two connecting lines 10, 11. The flow of current results in the electrical conductors that are involved being heated. The area of the drivable contact piece 15 is therefore also heated, and this area remains within the shielding housing 12 even in the connected state. It is impossible to avoid an increased contact resistance in particular in the area of the sliding contact arrangement 17, thus resulting in heating there, which heats the electrically insulating fluid within the shielding housing 12. A convective flow occurs, driven by this heating, through the flow channel in the first connecting line 10 and through the channel 18 on the circumference of the first connecting line 10.

The fluid flow which is produced in the flow channel in the first connecting line 10 results in improved cooling of the current-carrying elements located within the shielding housing 12.

In order to achieve additional cooling, it is possible for the second connecting line 11 to be surrounded by a shielding unit 23. The shielding unit 23 surrounds the opposing contact piece of the second connecting line 11 in the form of a shielding ring, which is supported by the funnel-shaped insulating body 7a of the disk-type insulator 7 of the third flange 6. On its attachment area, recesses pass through the shielding unit 23 and break through the annular structure, so as to allow an electrically insulating fluid to flow adequately through the shielding unit 23, even when the drivable contact piece 15 is in the connected state, as shown in FIG. 2.

Figure 3:
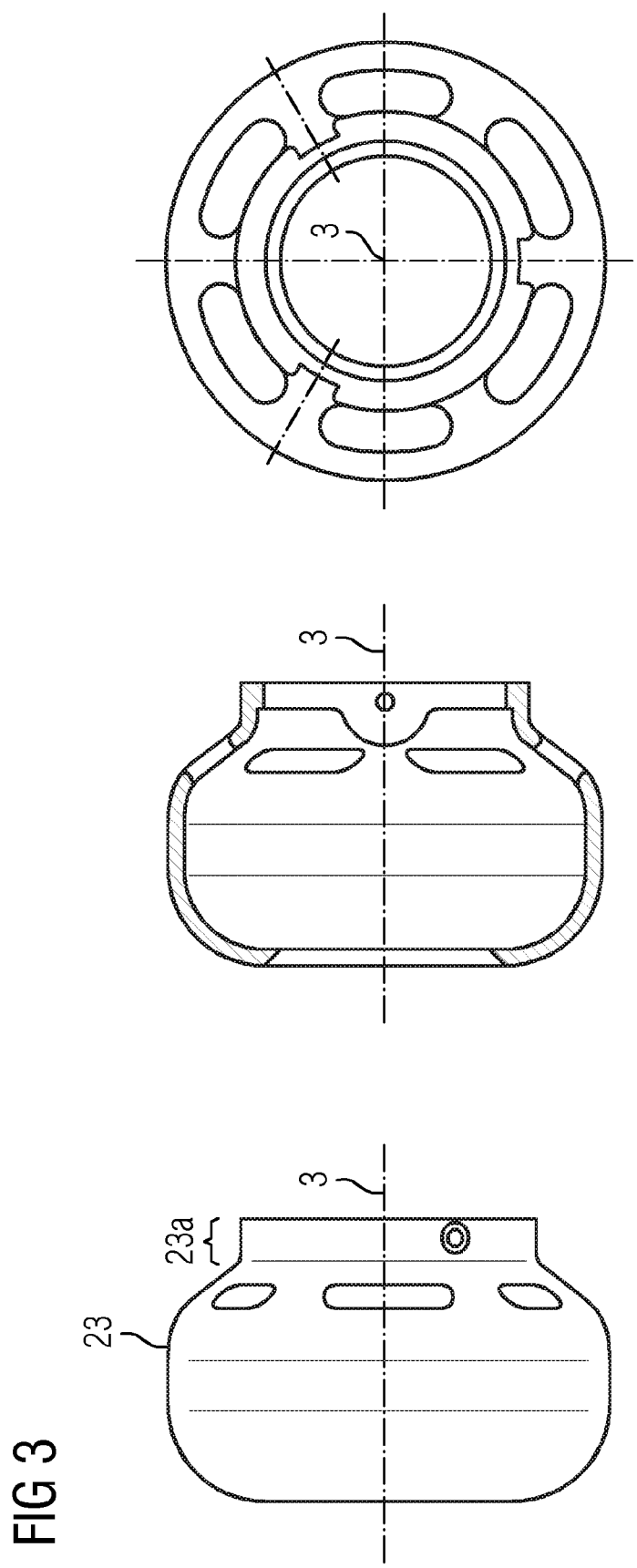
FIG. 3 shows a plurality of views of a shielding unit of an opposing contact piece.

FIG. 3 shows a side view of the shielding unit 23. The shielding unit 23 has a cap 23a by means of which the shielding unit 23 can be attached to the second connecting line 11. The shielding unit 23 is at the same electrical potential as the second connecting line 11. The shielding unit 23 is provided with an essentially toroidal outer structure, in order to dielectrically shield the areas located in the interior. At its end facing the cap 23a, a multiplicity of recesses pass through the shielding unit 23, and are arranged in an annular shape in the area of the transition to the cap 23a. FIG. 3 shows a cross section through the shielding unit 23 relating to this. Furthermore, FIG. 3 shows a view of the cap 23a in the direction of the second main axis 3.

Figure 4:
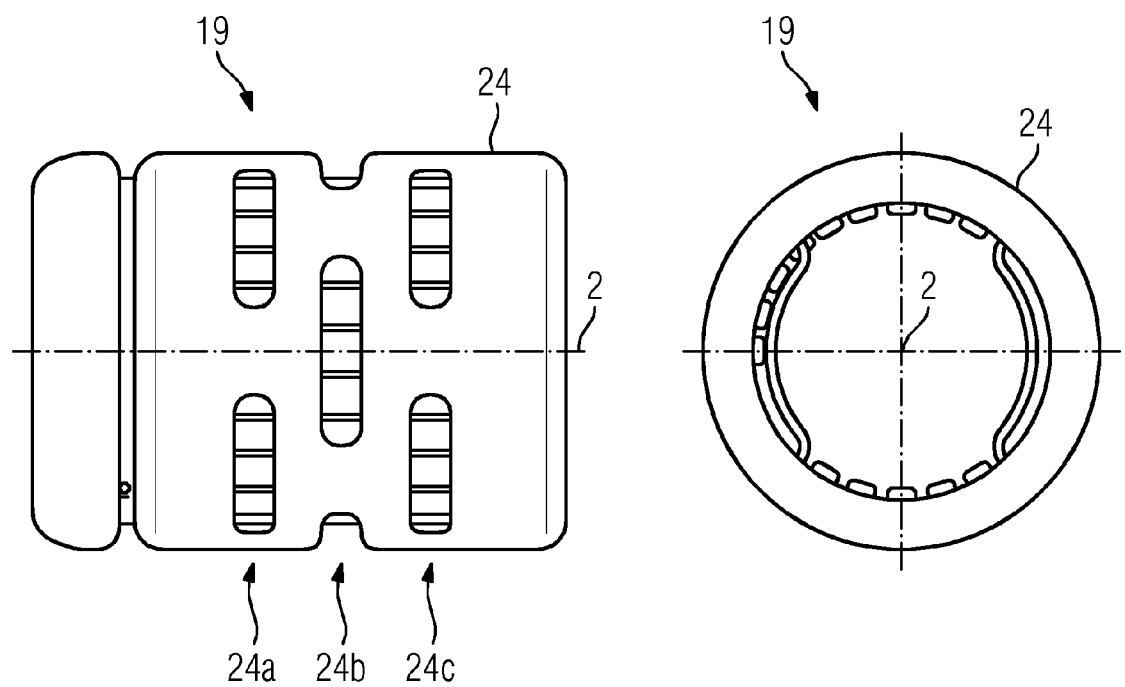
FIG. 4 shows a view of the envelope side and end face of a coupling piece.

FIG. 4 shows a side view and an end view, in order to describe the coupling piece 19 in more detail. The coupling piece 19 has a mechanically load-bearing base body 24, through which a plurality of recesses pass. The recesses in the base body 24 are arranged circumferentially on a first annular path 24a, on a second annular path 24b and on a third annular path 24c. The recesses in the base body 24 are each in the form of elongated holes. The recesses in the base body 24 are covered by contact elements 25 which are arranged within the base body 24. The contact elements 25 in this case at least partially conceal recesses in the base body 24.

Figure 5:
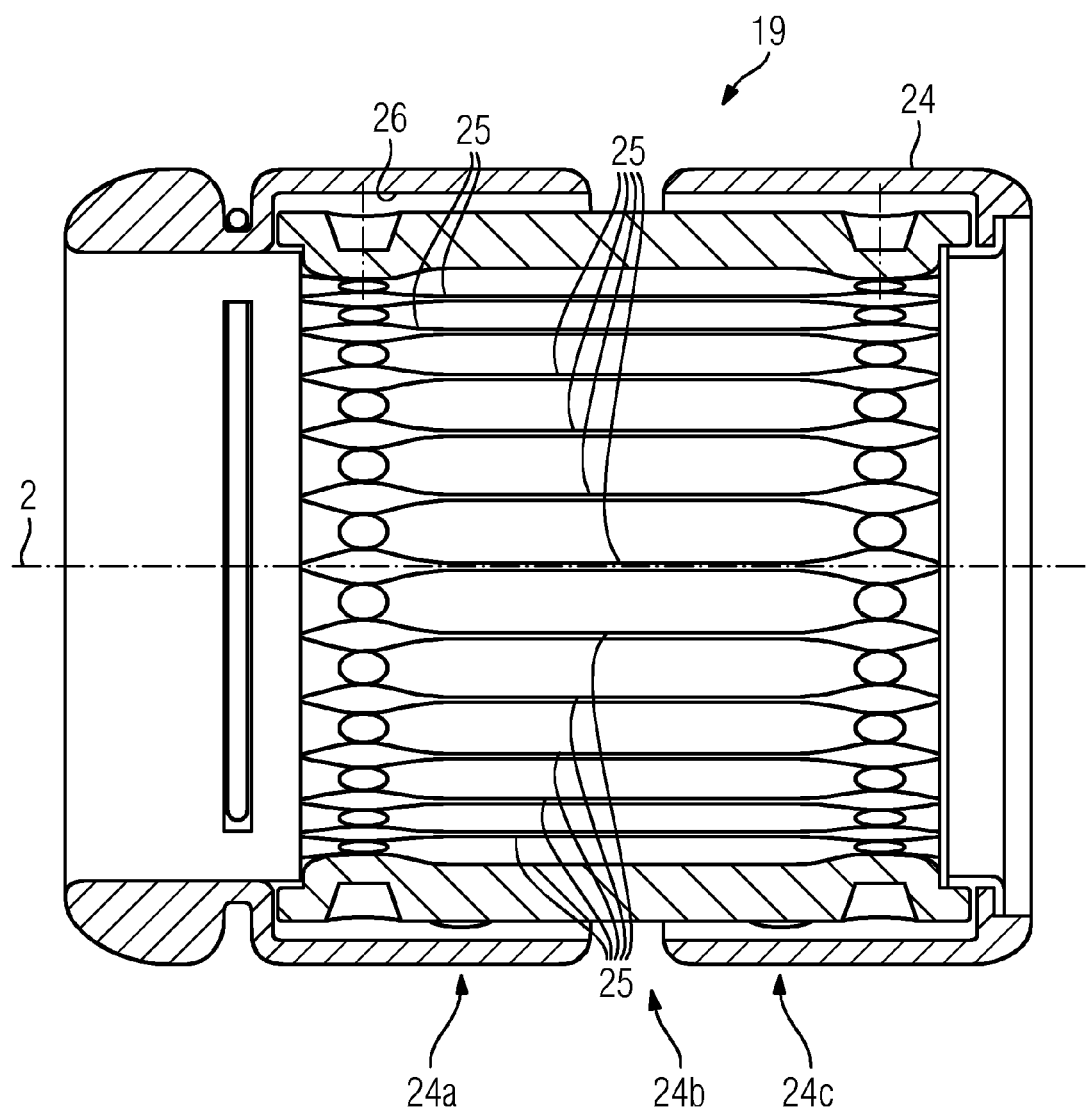
FIG. 5 shows a section through the coupling piece.

FIG. 5 shows a section through the coupling piece 19 as known from FIGS. 1, 2 and 4. Contact elements 25 are inserted into a circumferential recess 26 in the rotationally symmetrical base body 24. The contact elements 25 form a circumferential cage, with contact-making points being provided at each of the ends. The contact-making points are arranged in the form of sockets, such that corresponding opposite matching connecting pieces can be inserted in order to make electrical contact. For example, a first connecting line 10 can be inserted into a socket in the coupling piece 19 for this purpose. By way of example, a further connecting element 20 can be inserted into a further socket in the coupling piece 19. Electrically conductive contact is made via the contact-making elements 25 with the two coaxially aligned first connecting lines 10 and the further connecting element 20.

Figure 6:
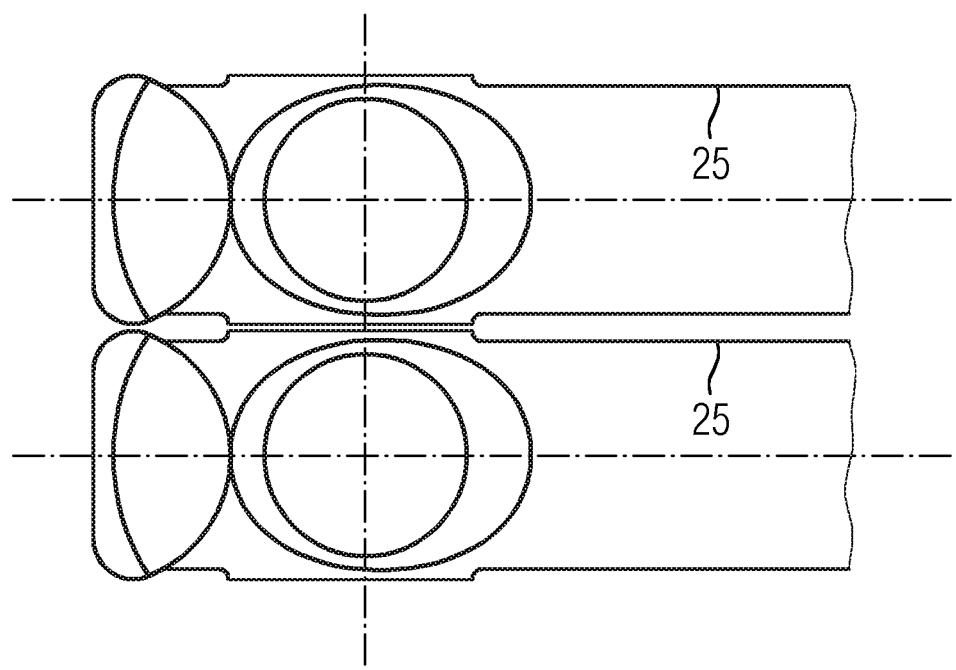
FIG. 6 shows an alternative refinement of contact-making points of the coupling piece.

FIG. 6 shows an alternative refinement variant of the embodiment of contact-making points for the contact elements 25. The contact elements 25 are provided with recesses on mutually facing body edges, such that openings for flow to pass through are formed between the contact elements 25. Adjacent contact-making points 25 touch one another in the area of the contact-making points, such that the position of the contact elements 25 with respect to one another is fixed.

The invention claimed is:

1. An electrical switching device, comprising:
   an interrupter unit having a first connecting line and a second connecting line;
   a fluid-tight encapsulating housing encapsulating said interrupter unit and being filled with an electrically insulating fluid;
   a shielding housing at least partially surrounding said interrupter unit;
   said first connecting line having at least one flow channel for the fluid, said flow channel having a first mouth opening within said shielding housing and a second mouth opening outside said shielding housing.

2. The electrical switching device according to claim 1, wherein said first connecting line ends at a coupling piece and said coupling piece is formed with at least one radially aligned recess.

3. The electrical switching device according to claim 2, wherein said coupling piece is formed with a plurality of radially aligned opening that are arranged in an annular shape circumferentially, and separated axially.

4. The electrical switching device according to claim 1, wherein said first connecting line passes through said shielding housing, and wherein a channel for the fluid is formed in the passage area between said first connecting line and said shielding housing.

5. The electrical switching device according to claim 1, which comprises a contact piece movably disposed along a movement axis through a housing wall of said shielding housing, wherein said flow channel opens in said shielding housing from a radial direction with respect to the movement axis.

6. The electrical switching device according to claim 1, configured as a right-angle disconnector.

7. The electrical switching device according to claim 1, wherein said shielding housing has a rotationally symmetrical envelope contour with a first end face, and said first connecting line is arranged on said first end face.

8. The electrical switching device according to claim 7, wherein said shielding housing further has a second end face, and a section that widens radially with respect to said first and second end faces is located between said first and second end faces, and said radially widening section is formed with an opening through which the movement axis passes.

9. The electrical switching device according to claim 8, which comprises a conical transition section arranged from said second end face to said radially widening section, said conical transition section being formed with at least one opening that passes through said housing wall of said shielding housing.

* * * * *